Patented Aug. 22, 1933

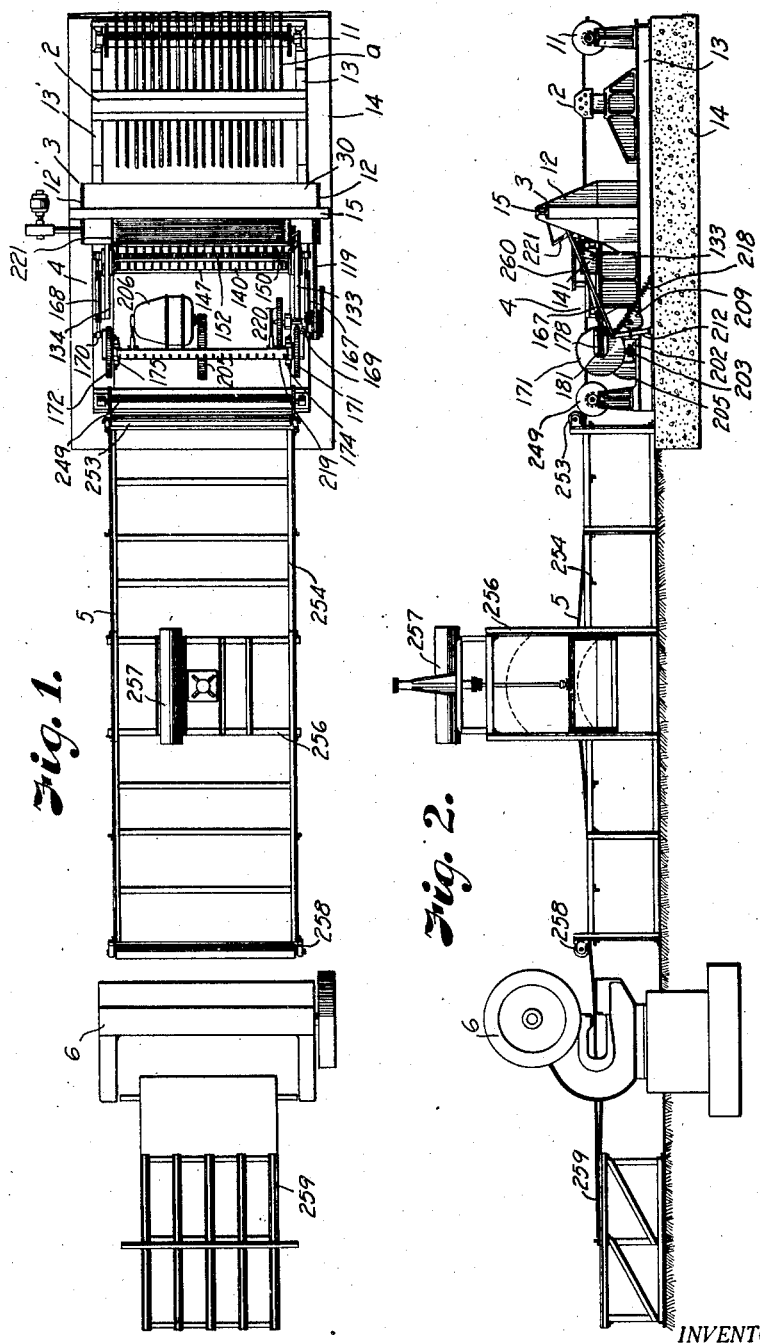

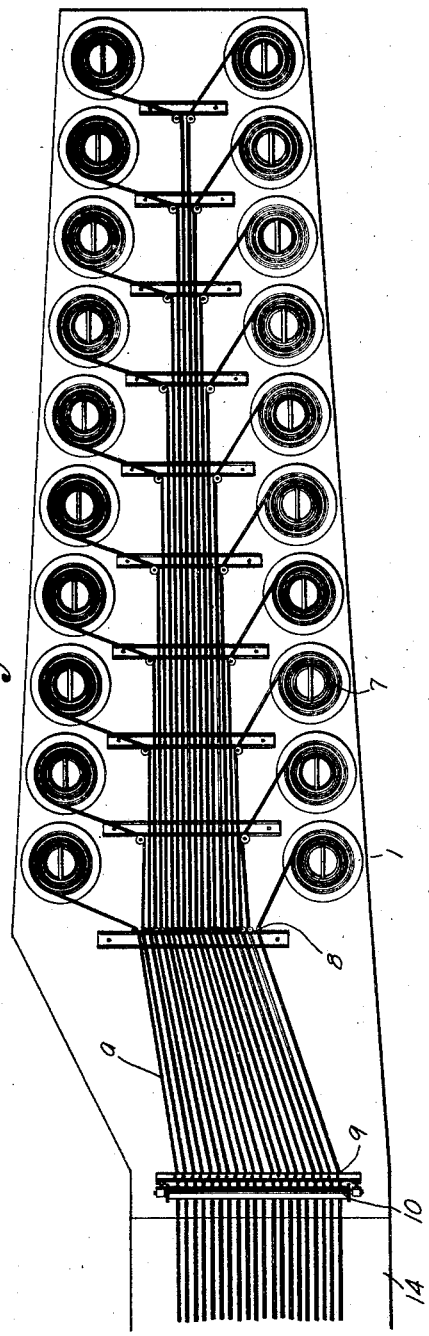
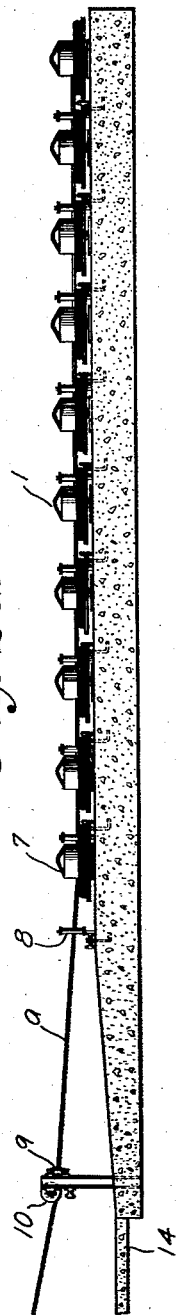

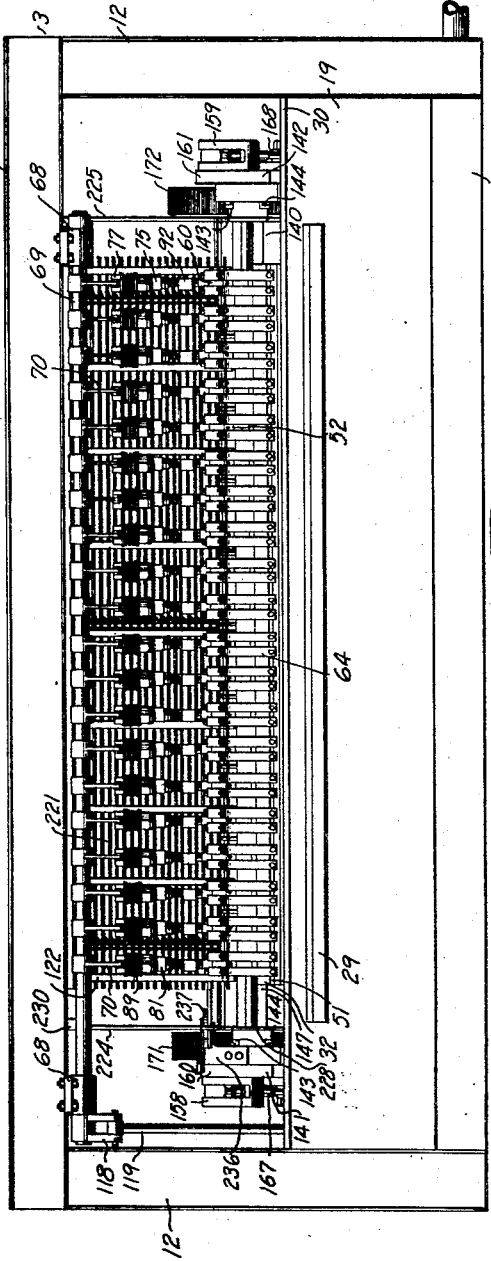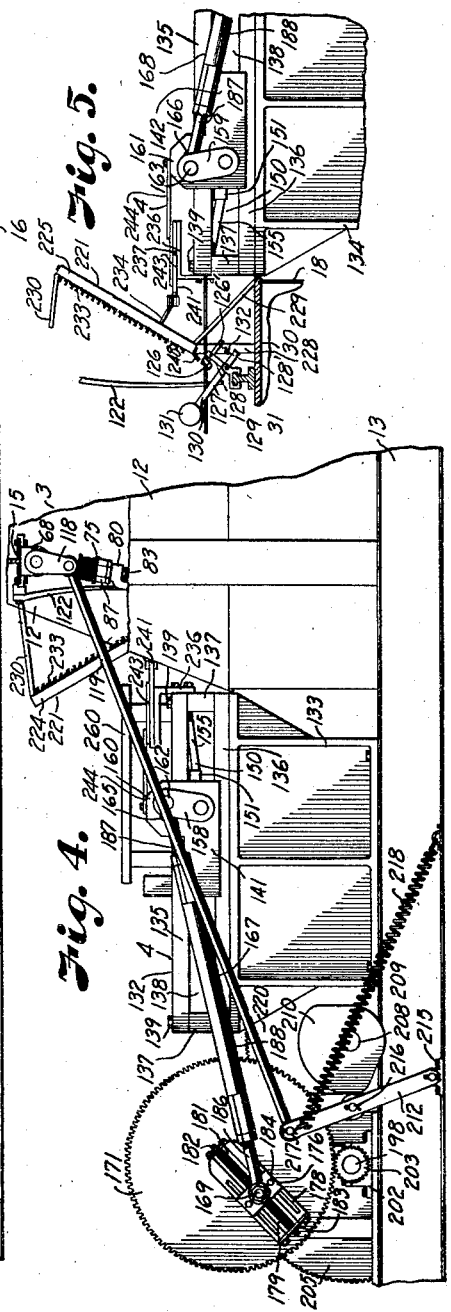

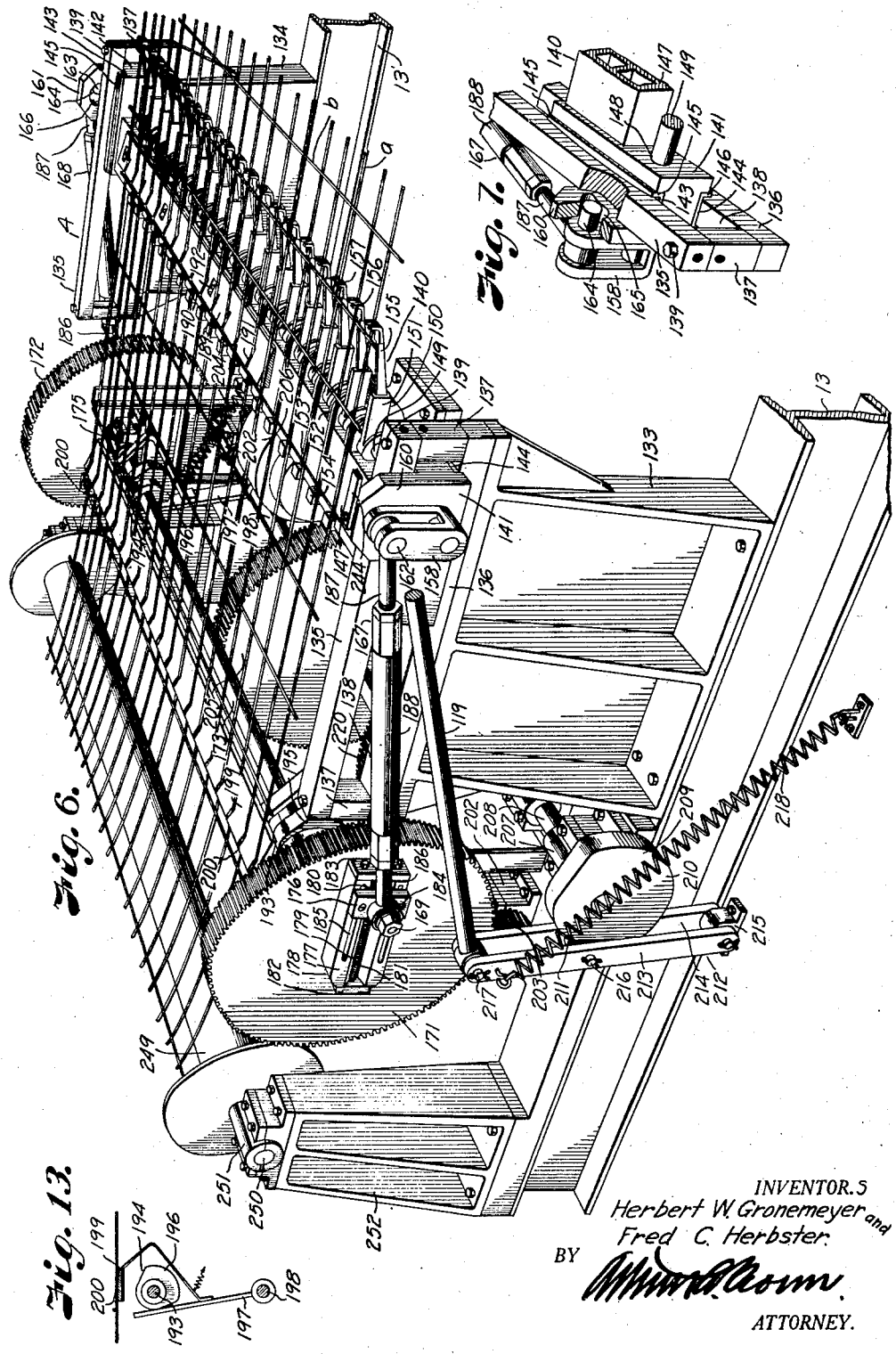

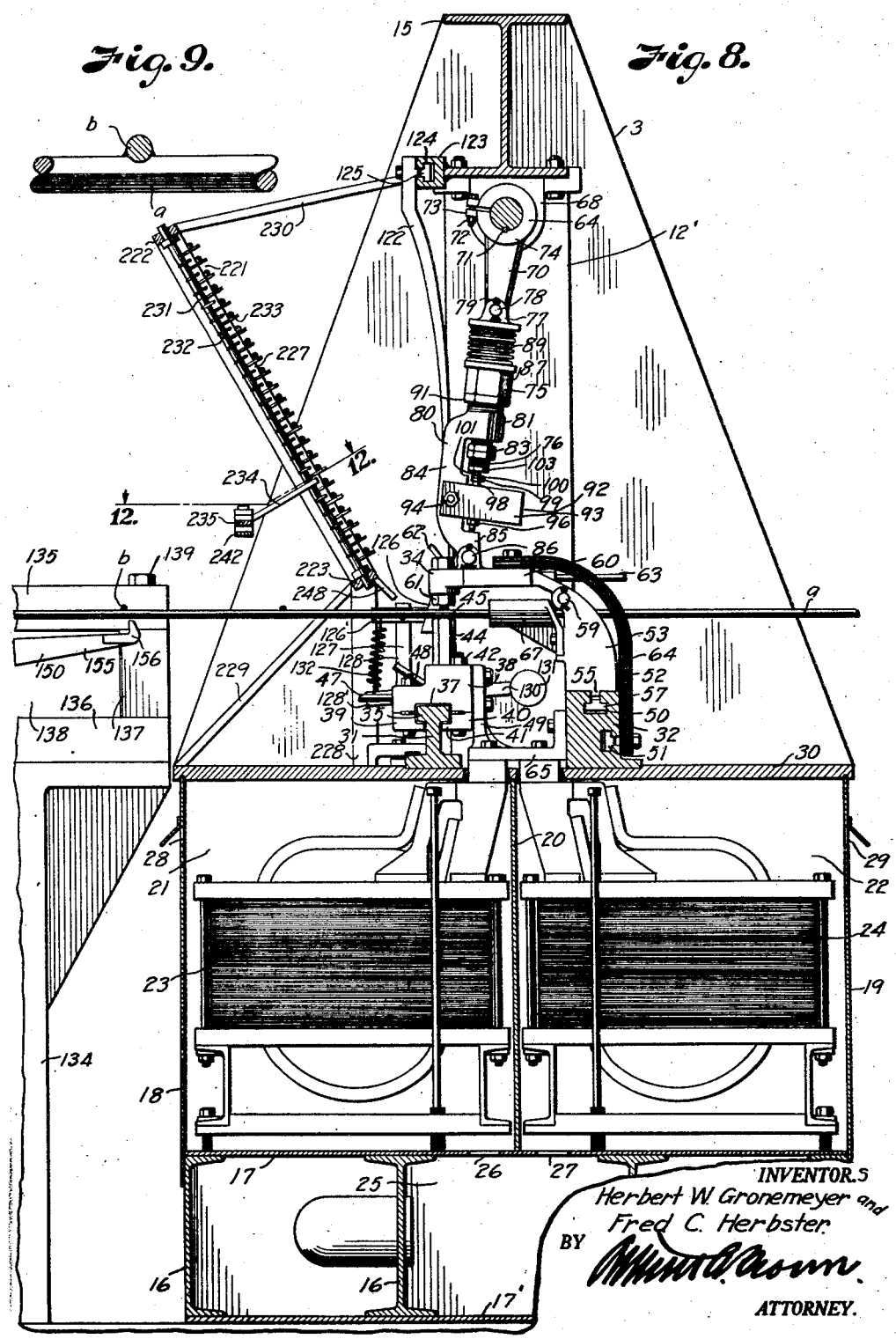

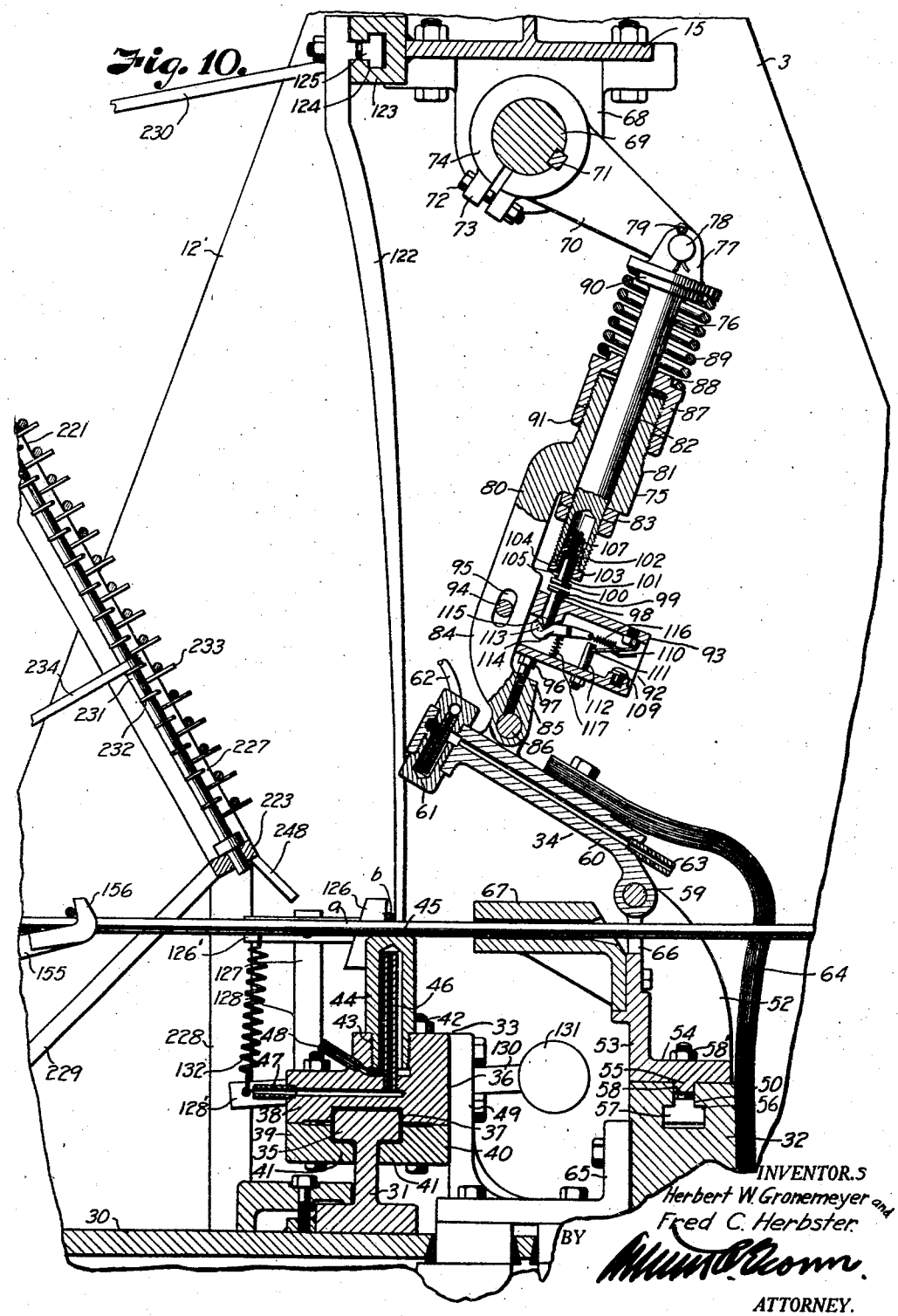

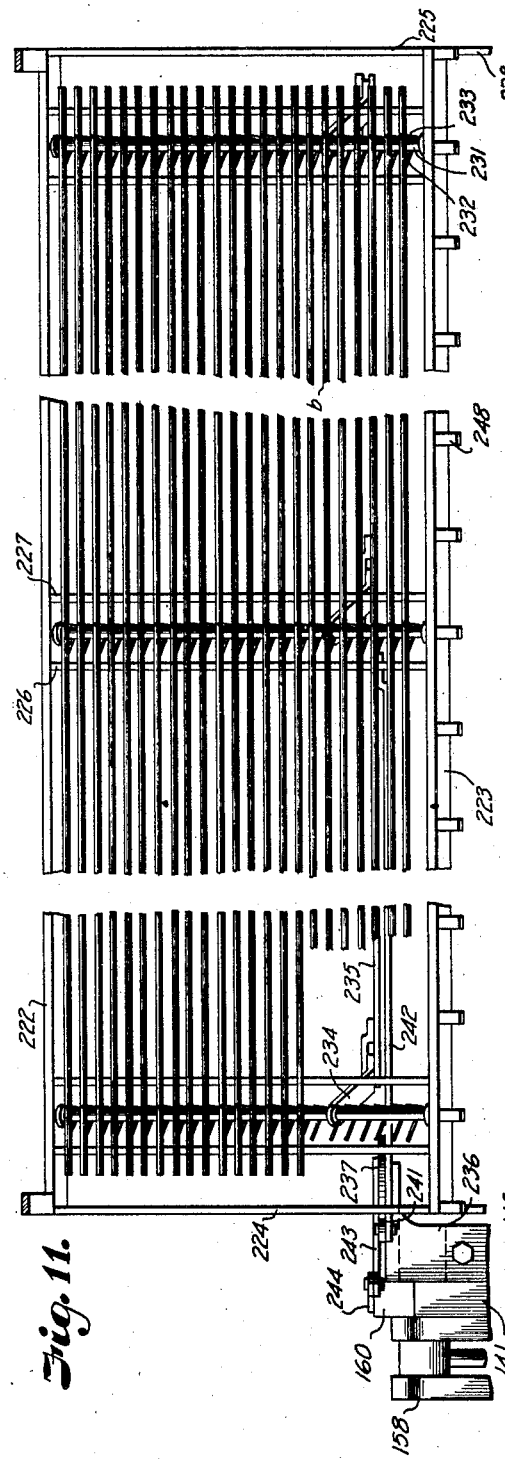
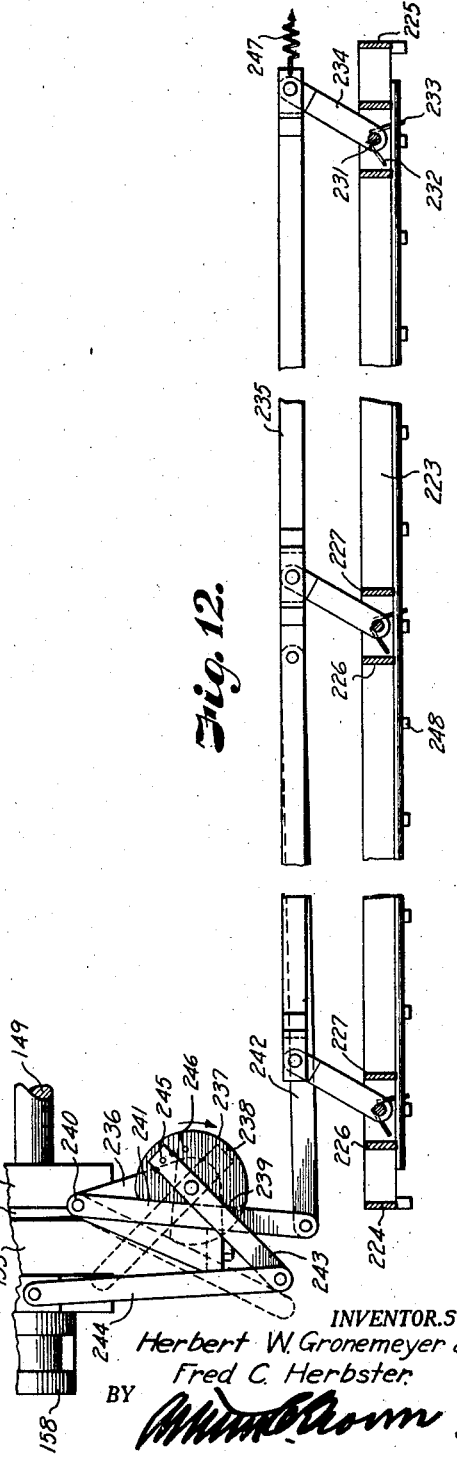

1,923,369

UNITED STATES PATENT OFFICE 1,923,369

APPARATUS FOR MANUFACTURING WELDED WIRE MATTINGS

Herbert W. Gronemeyer and Fred C. Herbster, Kansas City, Mo., assignors to Sheffield Steel Corporation, Kansas City, Mo., a Corporation of Delaware Application June 28, 1932. Serial No. 619,726

18 Claims. (Cl. 140—112)

This invention relates to an apparatus for manufacturing welded wire mattings such as are used in reinforcing concrete slabs, and has for its principal objects to provide an apparatus whereby such mattings can be produced with greater accuracy both as to spacing of the wires and the location of the welds, so that the mats will be straight and free from internal strains tending to cause distortion.

Another important object of the invention is to provide for automatically controlling the welding current in order that the crossing points of all wires will have substantially the same effective weld regardless of their cross sectional areas, so that mats may be produced having different size wires to conform to the required specification.

It is also an important object of the invention to retain the mat in substantially a flat plane throughout the process of fabrication.

In accomplishing these and other objects of the invention, we have provided improved details of structure, the preferred form of which is illustrated in the accompanying drawings, wherein:

Fig. 1 is a plan view of the wire assembling and welding portion of the machine including the pulling mechanism for advancing the matting therethrough and the shear for cutting the matting in sections.

Fig. 1a is a plan view of the opposite end of the machine showing the method of storing the longitudinal wires from which the matting is constructed.

Fig. 2 is a side elevational view of the portion of the machine illustrated in Fig. 1.

Fig. 2a is a side elevational view of the portion of the machine illustrated in Fig. 1a.

Fig. 3 is an enlarged front view of the welder for welding the cross wires to the longitudinal wires of the matting.

Fig. 4 is an enlarged side elevational view of the wire pulling apparatus for advancing the matting through the welder.

Fig. 5 is a side elevational view of the wire pulling cross head and the mechanism for feeding and holding the cross wires in welding position.

Fig. 6 is an enlarged perspective view of the wire pulling apparatus that advances the matting through the machine.

Fig. 7 is a detail perspective view, partly in section, of one end of the wire pulling cross head, particularly illustrating the lost motion connection with one of its actuators, to allow movement of the gripping fingers to and from engagement with the cross wires at the ends of their travel.

Fig. 8 is an enlarged longitudinal, vertical, sectional view through the welding portion of the machine, illustrating the welding heads in position for welding the cross wire to the longitudinal wires.

Fig 9 is a detail sectional view of a portion of the mat illustrating one of the welds.

Fig. 10 is an enlarged detail sectional view through one of the welding heads, particularly illustrating the construction and operation of the electrodes.

Fig. 11 is a front view of the rack for feeding the cross wires into welding position.

Fig. 12 is a sectional view on the line 12—12, Fig. 8, of the mechanism illustrated in Fig. 11.

Fig. 13 is a detail sectional view of the mechanism for retaining the matting and longitudinal wires in taut condition during release of the gripping fingers.

Referring more in detail to the drawings:—

1 designates storage for the longitudinal wires composing the mat, 2 a wire straightening apparatus, 3 the welder through which the wires are drawn for attaching the cross wires, 4 the wire pulling and tensioning apparatus for advancing the matting as it is being constructed, 5 apparatus for supporting the completed matting, and 6 the shear for cutting the matting into sections.

The wire storage 1 includes a reel 7 for each longitudinal wire $a$ of the matting and from which the wire is withdrawn over guide rollers 8 through spacing openings in a bar 9 so that the wires are arranged at the same spacing they will assume in the completed mat.

From the spacing bar the wires are guided in spaced relation over roller stands 10 and 11 to the straighteners 2 which may be of any conventional design for straightening and tensioning the wires before delivery through the welder.

The welder 3 includes vertical side frames 12—12' supported at a point substantially midway of the longitudinal beams 13—13' that are carried on a suitable foundation 14. The upper ends of the side frames are connected by a cross beam 15 and their lower ends are connected by a plurality of spaced cross beams 16 enclosed by spaced plates 17—17' and forming a support for a series of transformers later described.

Mounted on the beams 16 is a transformer housing including the plate 17 and side plates 18 and 19 extending above the outer beams 16 and cooperating with a central partition 20 to form spaced transformer chambers 21 and 22 extending transversely between the side frames. Located in each of the chambers is a row of spaced transformers 23 and 24 for supplying current to the individual welding heads later described.

The floor section 17 of the housing cooperates with the central cross beams 16 to form an air duct 25 extending longitudinally of the chambers for distributing air through openings 26 and 27 in the floor section to the respective chambers for cooling the transformers, the air being discharged through suitable louvred openings 28 and 29 adjacent the upper edges of the side plates 18 and 19, respectively. The tops of the transformer chambers are closed by a horizontal plate 30 extending between the side supports of the welder frame and forming a table for supporting a plurality of welding heads as now described.

Extending across the table between the side frames are spaced rails 31 and 32 for adjustably mounting spaced pairs of welding heads 33 and 34, respectively.

The rail 31 includes an I-beam member having a head portion 35 adjustably supporting clamping members 36 carrying the electrodes 44. The clamps are insulated from the head of the rail by suitable insulation, as indicated at 37, and include upper clamping members 38 having channel-shaped grooves in their lower faces to seat on the head of the rail, and complementary clamping members 39 and 40 having shoulder portions 41 for engaging under the head of the rail. The clamping members 39 and 40 are secured to the members 38 by suitable draw bolts 42, as illustrated in Fig. 10.

Threaded into sockets 43 formed in the upper face of each of the upper clamping members are electrodes 44 having flat upper ends 45 forming welding faces for contacting the longitudinal wires of the matting which is drawn through the machine as later described. The electrodes 44 are preferably hollow, and extending upwardly therein is a tube 46 communicating at its lower end with a water inlet connection 47 so that water may be circulated through the tube to the upper end of the members 44 and to an outlet connection 48 to maintain the electrodes in cool condition.

The upper electrode clamping members 38 are connected to the positive leads of the respective transformers 23 or 24 by L-shaped brackets 49.

The rail 32 provides a ground connection for the negative leads of each of the transformers and is provided on its upper face with a T-shaped slot 50 and on its side face with a similar slot 51 for adjustably mounting a plurality of electrode holders 52 for the negative electrodes now described.

The negative electrode holders include L-shaped brackets 53 having base portions 54 provided on their lower faces with ribs 55 operable in the narrow portions of the slot 50, as best illustrated in Fig. 10. The bracket members are clamped to the rails by bolts 56 having T-shaped heads 57 operable in the enlarged portion of the slot 50 and shanks 58 which extend through suitable openings in the base portion 54 of the brackets and are clamped by nuts 58'.

Swingingly mounted on the upper ends of the brackets 53 on pins 59 are electrode arms 60 having head portions carrying electrodes 61 cooperating with the electrodes 44 to effect a weld, as later described.

The electrodes 61 are also water-cooled in a manner similar to the electrodes 44, the water being admitted through a flexible connection 62 and discharged through a flexible conduit 63 after circulation through the heads of the electrode arms. The electrode arms are grounded to the rail 32 by flexible leads 64 as in ordinary construction, and the rail is in turn connected with the negative leads on all the transformers by suitable bracket-shaped connections 65.

Supported in line with openings 66 in the brackets 53 and projecting toward the electrodes 44 are tubular wire guides 67 for guiding the wires across the terminals of the electrodes.

Extending below the upper cross beam 15 and pivotally mounted in spaced bearings 68 is a rock shaft 69 carrying a plurality of electrode operating arms 70. The arms 70 are adjustably keyed to the rock shaft by a spline 71, and are clamped in adjusted position by bolts 72 projecting through ears 73 on split collars 74 carrying the arms, as illustrated in Fig. 10. Pivotally connected with the free ends of the arms are spring tensioned connecting links 75 for applying pressure on the negative electrodes during the welding operation.

The connecting links 75 include stems 76 having bifurcated heads 77 at their upper ends to receive the ends of the arms 70 which are pivotally secured thereto by pins 78 that are retained by cotter pins 79. Slidably supported on the lower ends of the stems are control links 80 pivotally connected with the arms carrying the negative electrodes. The links 80 include collar portions 81 having axial bores 82 for slidably receiving the stems 76 which project therethrough and carry lock nuts 83 for adjustably retaining the control links on the stems.

Extending from the sides of the collars and depending therefrom are bar portions 84 having inwardly curved lower ends 85 that are connected to the arms 60 by pivot pins 86.

Threaded on the upper ends of the collars 81 are spring adjusting caps 87 having spring seats 88 at their upper ends for seating the lower ends of coil springs 89. The upper ends of the springs are seated against similar spring seats 90 formed on the lower side of the heads 77. Jamb nuts 91 are also threaded onto the collar portions to retain the caps in adjusted position.

It is apparent that upon rotary movement of the rock shaft 69 in a clockwise direction (Fig. 10) the arms 70, stems 76, and control links 80 act as a toggle joint to move the electrode arms into welding position. When the heads of the electrode arms are stopped by the work being welded, continued movement of the arms 70 effects compression of the springs 89 to apply pressure to the work during the welding step.

In order that a sufficient current may be passed through the electrodes to effect a proper weld of the wires we provide means for automatically controlling the time that the current is on proportionate to the degree of compression or reduction in thickness of the joint as the cross wires b sink into the longitudinal wires, as later described.

In accomplishing this object we provide the bar portion 84 of each control link with a switch 92 for controlling the primary current to the respective transformers as now described. The switch includes a housing 93 adjustably supported on the link by a bolt 94 operating in a slot 95 therein, and the housing is retained in adjusted position longitudinally of the bar portion of the link by a set screw 96 having its head bearing under the lower face of the housing and its shank threaded into a boss 97 formed above the pivot connection with the electrode arm.

Slidably mounted in the upper wall of the housing 93 in the extended axis of the stem is a plunger 98 having a flanged head 99 at its upper end adapted to be engaged by the head 100 of a similar spring-pressed plunger 101 carried in the lower end of each control stem, as illustrated in Fig. 10. The lower ends of the control stems are provided with a threaded bore 102 in which is secured a threaded socket member 103 having an axial opening 104 through which the shank of the plunger 101 is extended. Sleeved over the shank of the plunger is a shock-absorbing spring 105 having one end bearing against the head 100 of the plunger and its opposite end against the bottom of the member 103. Tension of the spring is adjusted by lock nuts 107 threaded on the shank of the plunger and bearing against the inner end of the member 103.

It is thus apparent that when the springs 89 are compressed upon downward swinging movement of the arms 70 the head of the plunger 101 yieldingly engages against the plunger 98 and moves it downwardly into the housing to effect operation of a switch mechanism in the switch housing 93 to close the primary circuit.

The switch mechanism includes a stationary contact 109 engageable by a movable contact spring 110 supported by a knife joint 111 on a post 112 extending upwardly within the housing. Pivotally mounted in the walls of the housing on trunnions 113 is a switch-operating arm 114 having a notched seat 115 adapted to engage the end of the plunger 98 and having connection with the contact spring 110 by a coil spring 116. The arm is normally retained against movement exerted by the plunger 98 by a spring 117 having one end bearing under the arm and the other against the lower side of the housing.

Continued downward movement of the plunger 98, after being engaged by the plunger 101, causes the arm 114 to swing in a downward direction below the fulcrum point of the contact spring 110, tensioning the spring 116 to draw the contact spring into snap engagement with the fixed contact 109, completing the circuit to the transformer. As soon as the primary circuit is completed the current flows through the work being welded to heat it to welding temperature.

Upon application of the welding current the metal softens, and pressure of the springs 89 reduces the thickness of the joints, which reduction is followed by the control links so that they shift on the stems 76. This additional movement of the control links on the stems carries the switch housing downwardly therewith to move the plunger 98 away from the plunger 101. The springs 117 will then shift the operating arms 114 in the opposite direction, at which time the contacts are broken due to shifting pull of the springs 116 to break the primary circuits to the respective transformers. It is, therefore, apparent that the current for each pair of electrodes is established for the time required to effect a given reduction in the joints being welded. This reduction will, of course, vary according to the condition and size of the wires.

In order to actuate the rock shaft 69, the end thereof adjacent one of the side frames is provided with a crank arm 118 operably connected by a rod 119 with an actuating lever, later described, operable in timed relation with the wire pulling apparatus as later described.

In order to align the cross wires in position between the negative and positive electrodes and across the longitudinal wires, we provide a plurality of fingers 122 depending between certain of the electrode heads and terminating in the plane of the vertical axes of the positive electrodes. The guide fingers 122 are laterally adjustable on a rail 123 fixed to the lower flange of the cross beam 15 and which is provided with a T-shaped slot 124 wherein T-headed bolts 125 are slidably mounted to clamp the fingers in selected position. The fingers 122 thus provide stops or gages against which the cross wires are retained by yieldable clamp heads 126 carried on the vertical arms 127 of bell crank levers 128 that are pivotally supported on brackets 129 carried by the rail 31. The other arms 130 of the bell cranks extend in the direction from which the wires are drawn and carry weights 131 to retain the clamp heads in position to yieldingly retain the cross wires against the fingers 122. The clamp heads 126 are preferably pivotally mounted on the bell cranks and are retained in functional position by springs 132 connected to extensions 126' on the heads and to arms 128' of the bell crank levers 128, as shown in Figs. 5 and 10, in order that the clamps may yield in case that an electrode or other moving part may strike them when they are in functional position.

The wire pulling and tensioning apparatus for advancing the matting as it is being completed includes spaced side frames 133 and 134 carried by the longitudinal beams 13—13' previously described.

The side frames 133 and 134 terminate in the extended plane of the table 30 of the welder and carry cross head guides, each including upper and lower bars 135 and 136 spaced apart by blocks 137 located between the ends thereof to form a guideway or track 138. The blocks 137 and bars 135 and 136 are retained by bolts 139 extending through openings in the bars and blocks and into threaded sockets in the side frames 133—134.

The cross head 140 includes guide shoes 141 and 142 mounted in the guide slots and having upper and lower channel-shaped seats 143 and 144 slidably engaging the adjacent sides of the respective bars 135 and 136. The guide shoes are preferably provided with suitable wearing plates 145 and 146, respectively, which may be adjusted from time to time to take up the wear between the shoes and their guides.

Extending between the side frames and carried by the guide shoes is a connecting cross beam 147 having its ends fixed to the side faces of the guide shoes, as best illustrated in Fig. 7. Rotatably carried in bearing openings 148 in the forward ends of the guide shoes at a point spaced laterally from the beam 147 is a rock shaft 149 carrying a plurality of wire-engaging fingers 150 arranged for gripping the cross wires of the matting and for drawing the longitudinal wires through the welder to position them for attaching the succeeding cross wires, as later described.

The fingers 150 include forwardly extending, channel-shaped arms 151 adjustably clamped on the rock shaft 149 between spaced bearings 152 adjustably tied to the beam 147 by U-bolts 153. The U-bolts extend around the bearings and have their shanks extending across the top and bottom of the beam and through keeper plates 154 engaging the opposite side of the beam to anchor and stiffen the shaft against the draft of the fingers when they are exerting pull on the wires. Secured to the ends of the arms 151 are extensions 155 having upwardly directed hook-shaped ends 156 provided with notches 157 to straddle the longitudinal wires and allow the upper ends of the fingers to engage the cross wires, as illustrated in Fig. 6.

Fixed to the ends of the rock shaft 149 are yoke-shaped lever arms 158 and 159 extending upwardly in parallel relation with upwardly extending ears 160 and 161 on the guide shoes.

Extending through the ends of the arms 158 and 159 are wrist pins 162 and 163 having ends 164 projecting into arcuate-shaped slots 165 and 166 formed in the ears 160 and 161, respectively. Pivotally mounted between the forks of the arms 158 are connecting rods 167 and 168 having their opposite ends pivotally connected with eccentric pins 169 and 170 carried on gear wheels 171 and 172. The gear wheels 171 and 172 are fixed on the ends of a countershaft 173 supported in bearings 174 and 175 carried by channels 13—13', as best illustrated in Fig. 6.

With the construction thus described it is apparent that revolution of the eccentric pins 169 and 170 actuates the connecting rods to reciprocate the cross head in its guides through engagement of the end of the wrist pins 162 with the opposite ends of the slots 165 and 166, and that due to the pin and slot connection of the pitmen 162 and 163 with the cross head, the rock shaft 149 is actuated to move the fingers to and from the matting at the ends of the cross head travel; for example, as the eccentric pins move across top center toward the welder the wrist pins 162 engage the ends of the arcuate slots adjacent the welder and partially rotate the rock shaft to swing all of the wire gripping fingers in a downwardly direction, so that they will clear the matting as the cross head is moved toward the welder. At the end of the stroke the cross head remains idle while the wrist pins are being moved to the opposite ends of the arcuate slots. During this movement the rock shaft is actuated in the opposite direction to shift the wire gripping fingers into position for engaging one of the cross wires. As the eccentric pin is moved across the bottom center of the actuated gears the pitmen are drawn retractively to retract the cross head.

Due to engagement of the fingers with the cross wire the entire mat, including the longitudinal strands, is drawn through the welder to position the mat for the application of another cross wire, as later described.

Due to the various specifications under which the mattings are manufactured it is desirable, therefore, to provide adjustment of the crank pins whereby the stroke of the cross head may be varied to regulate the spacing or pitch of the cross wires which, of course, is governed by the extent that the mat is pulled through the welder upon each operation of the cross head.

To adjust the crank pins 169 and 170 radially of the gears 171 and 172 they are carried on T-blocks 176 slidable against the outer faces 177 of radially extending bosses 178 formed on the outer faces of the gears. Formed in the bosses 178 are V-shaped grooves 179 forming guides for inwardly extending heads 180 on the members 176. The heads 180 are threaded onto adjusting screws 181 rotatably mounted in bearings 182 and 183 bolted to the ends of the bosses 177. The shoulder portions of the T-blocks are provided with guide pins 184 movably mounted in guide grooves 185 in the bosses to prevent binding movement of the members 176 on the adjusting screws when they are adjusted thereby.

Upon adjustment of the eccentric pins it is also necessary to adjust the links of the connecting rods 167 and 168 in order that the gripping fingers will be in position to engage a cross wire when the connecting rods start their retractive movement. The connecting rods, therefore, include threaded end members 186 and 187 adjustably connected by turnbuckles 188 arranged to shorten or lengthen the spacing between the eccentric and wrist pins to compensate for radial adjustment of the eccentric pins relative to the gears 171 and 172.

In order to supplement the pull of the wire gripping fingers on the matting the cross head is provided with a longitudinally extending plate 189 having its upper face inclined upwardly from the forward edge of the connecting beam to provide a shoulder portion 190 on its rear edge for engaging one of the cross wires, as best illustrated in Fig. 6. The plate 189 is provided with grooves 191 to receive the longitudinal wires and allow engagement of the shoulder 190 with a cross wire.

The plate 189 is adjustably fixed to the upper face of the connecting beam by bolts 192 extending through slotted openings located therein at spaced intervals along the length of the beam in order to adjust it for different spacings of the cross wires.

Owing to the stretch of the longitudinal wires as they are drawn through the straightening rolls, it is desirable to maintain tension upon the matting during the time that the gripping fingers are disengaged and re-engaged with the matting, and we, therefore, provide the shaft 173 with spaced cams 193 and 194 having high lobe portions 195 and 196 for engaging arms 197 having their lower ends loosely mounted on a power shaft 198 extending across the side frames at a point below the shaft carrying the cams.

The arms 197 project upwardly in the path of the cams and carry an adjustable cross plate 199 having an inclined and grooved upper face 200, and is of the same construction as the plate 189 on the cross head, whereby the longitudinal wires extend through the grooves so that the rear edge of the plate can engage a cross wire to retain tension on the longitudinal wires during forward movement of the cross head, the cams being located relatively to the eccentric pins so that when the wire gripping fingers 150 are released the cams engage the lever arms to maintain the tension on the longitudinal wires.

The power shaft 198 is rotatably mounted in bearings 202 carried on the base frame members 13—13' and is provided with pinions 203 and 204 meshing with the gears 171 and 172. The power shaft is driven through suitable reducing gears designated 205 from a motor 206 located at a point between the side frames 133 and 134.

Also rotatably mounted in bearings 207 carried on the longitudinal beams 13—13' is a cam shaft 208 carrying at one end a cam 209 having a high lobe portion 210 engageable with a roller 211 on an actuating lever 212.

The lever 212 includes spaced links 213 and 214 pivoted at their lower ends to a bearing 215 supported on the foundation. The links extend upwardly from the bearing and carry a cross pin 216 for mounting the roller 211. The upper ends of the links are connected by a cross pin 217 to which the end of the connecting rod 119 is secured. The roller on the lever arm is retained against the cam by a spring 218.

The cam shaft 208 is driven in timed relation from the power shaft by meshing gears 219—220 on the respective shafts, as best illustrated in Fig. 1, so that the negative electrodes are moved into welding position during the forward travel of the cross head.

In order to feed the cross wires into the machine in timed relation to movement of the matting, we provide an inclined rack 221 (see Figs. 8, 11 and 12), which is carried from the framework of the welder and includes spaced cross bars 222 and 223 connected at their ends by bars 224 and 225, and by spaced pairs of intermediate bars 226 and 227. The lower portion of the frame is supported above the path of the matting on vertical posts 228 located adjacent the side frames of the welder, and is braced from the forward edge of the table by bars 229, as illustrated in Fig. 8. The frame inclines upwardly relatively to the table and its upper portion is supported in position by straps 230 having their ends connected with the I-beam 15 of the welder frame.

Rotatably mounted in the cross bars at points midway between the bars 226 and 227 are shafts 231 carrying rows of fingers 232—233, respectively, that are welded tangentially to the shafts and arranged so that the fingers in one row are in staggered relation to the fingers in the other row.

Fixed to the lower ends of each of the shafts adjacent the lower cross bar are rearwardly extending arms 234 interconnected by a link 235 so that when the link is reciprocated the shafts are rocked simultaneously to alternately shift the respective rows of fingers into and out of wire-supporting position, that is, when a wire is placed on the upper set of fingers and the shafts are rocked, the fingers supporting the wire are moved from supporting position to drop the wire onto the first fingers in the other rows which come into position to catch and support the wire. It is, therefore, apparent that wires placed on the upper pins will be progressively moved toward the lower part of the rack upon each actuation of the connecting link, so that a wire is delivered from the lowermost pins to drop onto the longitudinal wires and across the electrodes.

In order to actuate the connecting link so that a wire is delivered from the rack during each retractive movement of the cross head, we provide means for interconnecting the cross head with the link, as now described.

Fixed on the upper edge of the cross head guide, supported by the side frame 133, is a substantially triangular shaped bracket plate 236 for pivotally mounting a cam 237 having a substantially semi-circular high lobe portion 238 and a flat portion 239. Pivotally mounted on the opposite corner of the plate 236, as at 240, is an arm 241 arranged so that the flat face of the cam normally engages the side of the arm, but, when the cam is rotated, the circular portion of the cam will swing the arm to shift the connecting link. The free end of the arm is connected to the link 235 by a link 242, as best illustrated in Fig. 12.

In order to rock the cam 237, the cam is provided with a lever arm 243 pivotally supported on the axis of the cam and connected to the guide shoe 141 by a link 244. The arm 243 is adjustably fixed to the cam by a pin 245 extending through the arm and through one of a series of openings 246 in the cam, whereby the arm may be adjusted relatively to the cam upon adjustment of the stroke of the cross head. It is apparent that when the cross head moves retractively the link 244 will cause the arm 243 to rock the cam in a clockwise direction, Fig. 12, to effect lateral shifting of the link 235, and when the cross head moves in the reverse direction the cam will be returned to normal position so that the connecting link is shifted in reverse direction under influence of a spring 247.

The lower cross bar of the frame may be provided with a series of depending arms 248 for guiding the wires into position over the electrodes, as illustrated in Fig. 11.

The completed matting is delivered over a flanged guide roller 249 carried on a shaft 250 mounted in bearings 251 that are carried on the upper end of posts 252 supported by the ends of the beams 13—13', as best illustrated in Figs. 2 and 6.

Cooperating with the guide roller 249 is an upper guide roller 253 for guiding the mat onto a delivery table 254 and across an elevator 256 operable by an air cylinder 257 to raise the matting above the table for compensating in the length thereof while the matting is being cut into sections by the shear 6.

The end of the mat is guided through the shear by a cross roller 258 carried above the end of the table 254. From the shear the mat sections are delivered onto a table 259 from which they may be removed and bundled for shipping.

In operating a machine constructed and assembled as described, a sufficient number of reels 7 carrying the proper gauge wires $a$ are assembled as shown in Fig. 1a. The wire spacing bar 9 having openings spaced in conformity with desired spacing of the longitudinal wires of the matting is then applied adjacent the guide roller 8. The straightening rolls 2 are then adjusted relatively to each other as in ordinary practice to conform to the spacing of the openings in the spacing bar.

The welding heads 33 and 34 are then shifted on the rails 31 and 32 to position them in the path of the longitudinal wires by loosening the clamps and sliding the electrode holders longitudinally of the rails, at which time the arms 70 are also loosened and adjusted according to the spacing of the electrodes. The wire gripping fingers 150 are adjusted to the spacing of the longitudinal wires by shifting the arms and bearings 152 relatively to the rock shaft 149 and the cross beam 147, respectively.

A plate 189 having the required spacing of the slots 191 is applied to the cross beam 147 and adjusted to conform with the spacing of the cross wires $b$. A similar plate 199 is also attached to the arms 197.

The eccentric pins 169 and 170 are then adjusted radially of the gears 171 and 172 by operating the screw shafts 181 to provide the desired stroke of the cross head to give the required pitch of the cross wires $b$. The connecting rods 167 and 168 are then adjusted by manipulating the turnbuckles 188 so that when the eccentric pins are in substantially forward dead center position the cross head is at the forward end of its stroke.

The longitudinal wires $a$ are then drawn from the reels and threaded through the spacing bar 9, under the guide rolls 8, through the straightening rolls 2, and through the guide sleeves 67 carried by the negative electrode holders. The free ends of the wire $a$ are then placed under tension and two of the cross wires $b$ are welded by hand or otherwise secured to the longitudinal wires, one directly over the electrodes and the other in position to be engaged by the gripping fingers on the cross head.

The rack 221 is then filled with cross wires and the machine is started. An operator mounts the platform 260 and keeps the rack filled with cross wires as they are delivered to the welding machine. Rotation of the gears 171 and 172 causes the eccentric pins 169 and 170 to draw the cross head retractively to move the wrist pins 162 and 163 to the rear ends of the arcuate slots 165 and 166, thereby rocking the gripping fingers 150 into engagement with the first of the cross wires $b$. Continued movement of the eccentric pins draws the cross head retractively, pulling the longitudinal wires $a$ through the straightening rolls and across the electrodes and drawing the second cross wire into the relative position originally held by the first which was engaged by the gripping fingers.

When the cross head is moving on its back stroke, the second cross wire moves the clamping heads on their pivots until they are depressed sufficiently to pass thereunder, but prior to this the cam 237 is partially rotated by means of the link 244 to shift the link 235 for effecting feed of the lowermost cross rod onto the longitudinal wires. When the clamp heads are released, the weights return them to their original position, pushing the cross rod into engagement with the stop fingers.

As the eccentric pins are moving across the horizontal dead center, the wrist pins are shifted to the opposite ends of the slots, swinging the gripping fingers from engagement with the cross wire. As soon as the ends of the wrist pins engage the forward ends of the slots the cross head is again moved in a forward direction. At this time the cam 209 comes into position to actuate the lever 212 and connecting rod 119 to swing the crank arm 118, thereby effecting rotation of the rock shaft 69.

Rotation of the rock shaft swings the arms 70 in a downwardly direction and moves the negative electrodes into engagement with the cross wire which is then resting on the longitudinal wires directly over the positive electrodes. The arms 70 continue their movement to compress the springs 89 for applying a welding pressure to the electrodes.

When the plunger 101 engages the plunger 98 the circuit is closed through the primaries of the respective transformers by means of switches 92. As the welding current heats the crossing points of the wires the negative electrodes are urged by the springs 89 to compress and reduce the weld in thickness, as illustrated in Fig. 9. During this movement the control links 80 shift downwardly on the stems 76, moving the plungers 98 away from the plungers 101 which permits the springs 117 to shift the switch arms 114 in the opposite direction to break the circuits to the primaries.

About this time the high portion of the cam 209 has moved from engagement with the roller 211, returning the rock shaft to normal position and lifting the negative electrodes from the positive electrodes, as illustrated in Fig. 10. At this time the cross head has about completed its forward stroke and the connecting link 235 actuating the rack fingers is returned to its normal position by the spring 247, effecting feed of another cross wire onto the lower fingers to take the place of the one just delivered.

When the cross head has completed its stroke the connecting rods continue to move until the wrist pins engage the forward ends of the arcuate slots, shifting the clamping fingers into engagement with the second cross wire previously welded by hand. As the eccentric pins move across their lower path of travel the cross head is moved retractively, pulling the mat and the longitudinal wires through the machine a distance equal to the desired pitch of the wires.

The completed matting is delivered between the rolls 249 and 253 and across the elevator 256 to the shear 6, where the matting may be cut into desired lengths depending upon the specifications according to which the mats are constructed.

From the foregoing it is apparent that the crank mechanism for pulling the matting through the machine including the lost motion at the ends of travel of the cross head permits the matting to start and stop slowly so that less power is required to operate the machine. It is also possible to obtain adjustments to properly maintain the pitch of the cross wires to make a uniform mat. The crank operation of the cross head also permits the wires to be started through the straightening rolls with a minimum amount of power and eliminates the necessity of driving the straightening rolls as well as providing complicated clutches and synchronizing mechanism for starting and stopping the straightening rolls during the welding operation.

Pulling of the wires through the straightening rolls also maintains the wires in taut condition throughout the distance from the straightening rolls to the pulling mechanism, and the taut condition is maintained by the plate 199 during the release of the gripping fingers, insuring proper position of the wires when they are welded.

Attention is directed to the fact that the plate 199 tends to correct irregular spacing of the cross wires, since it pulls the longitudinal wires to a fixed point upon each rotation of the cams 196, and also forms an abutment for preventing the rearward movement of the mat caused by buckling thereof when the matting is momentarily stopped by operation of the shear.

What we claim and desire to secure by Letters Patent is:

1. In an apparatus of the character described, a plurality of spaced welding heads, means for guiding a longitudinal wire through each welding head, means for feeding cross wires individually to the welding heads, means for actuating the welding heads to weld the cross wires to the first named wires, gripping means for engaging a cross wire adjacent the welds, a head member for supporting the gripping means, means for slidably mounting the head member for movement to and from the welding heads, means for reciprocating the head member including means for moving the gripping means to and from gripping engagement with the cross wire for intermittently advancing the longitudinal wires, and means actuated by said actuating means for gripping a cross-wire during reciprocation of the head member in the direction of the welding head.

2. In a machine of the character described for producing matting having longitudinal and cross wires, means for welding the cross wires to the longitudinal wires, means for positioning the cross wires on the longitudinal wires during welding, reciprocating means for intermittently advancing the matting through the welding means, wire gripping means carried by the reciprocating means, means for actuating the reciprocating means including means for moving the wire gripping means to and from engagement with the cross wires, a second gripping means for engaging a cross-wire to hold the matting in taut condition, and means actuated by said said actuating means for rendering said second gripping means effective during reciprocation of said reciprocating means.

3. In a machine of the character described for producing matting having longitudinal and cross wires, means for positioning the cross-wires over the longitudinal wires means for successively welding the cross wires to the longitudinal wires, reciprocating means for advancing the matting through the welding means, wire gripping fingers pivotally mounted on the reciprocating means, and a crank mechanism having lost motion connection with said reciprocating means operable after final movements of the reciprocating means for moving the wire gripping fingers into and from engagement with the matting.

4. In a machine of the character described for producing matting having longitudinal and cross wires, means for moving cross wires into position on the longitudinal wires, means for tensioning the longitudinal wires, means for welding the cross wires to the longitudinal wires, a reciprocating cross head associated with the welding means, a plurality of wire gripping fingers pivotally mounted on the cross head, a lever arm associated with the gripping fingers, a wrist pin on the lever arm having lost motion connection with the cross head, an actuator for the cross head, and a connecting rod operably connecting the actuator with the wrist pin whereby the gripping fingers are moved to and from engagement with the matting during change of travel of the cross head.

5. An apparatus for producing a matting of the character described including means for tensioning spaced wires in the matting, means for positioning cross wires over the spaced wires, means for welding the crossing points of said wires to secure the cross wires to the spaced wires, and reciprocating means for gripping a cross wire adjacent the welds to pull the spaced wires into position for applying a succeeding cross wire a second gripping means, and means for supporting the second gripping means in the path of the matting for engaging a cross-wire to maintain tension on the longitudinal wires during operation of the welding means and while the first named gripping means is moving to gripping position.

6. In a machine of the character described for producing matting having longitudinal and cross wires, means for tensioning the longitudinal wires, means for welding cross wires to the longitudinal wires, a reciprocating cross head associated with the welding means, a plurality of wire gripping fingers pivotally mounted on the cross head, a lever arm associated with the gripping fingers, a wrist pin on the lever arm having lost motion connection with the cross head, an actuator for the cross head, and connecting rods operably connecting the actuator with the wrist pin whereby the gripping fingers are moved to gripping engagement with a cross wire during change of travel of the cross head to pull the longitudinal wires into position for applying a succeeding cross wire.

7. In a machine of the character described for producing matting having longitudinal and cross wires, means for tensioning the longitudinal wires, means for welding cross wires to the longitudinal wires, a reciprocating cross head associated with the welding means, a plurality of wire gripping fingers pivotally mounted on the cross head, a lever arm associated with the gripping fingers, a wrist pin on the lever arm having lost motion connection with the cross head, an actuator for the cross head, connecting rods operably connecting the actuator with the wrist pin whereby the gripping fingers are moved to gripping engagement with a cross wire during change of travel of the cross head to pull the longitudinal wires into position for applying a succeeding cross wire, and means for releasing the tensioning means during engagement of the gripping fingers.

8. In a machine of the character described for producing matting having longitudinal and cross wires, means for moving cross wires into position over the longitudinal wires, means for tensioning the longitudinal wires, means for successively welding the cross wires to the longitudinal wires, a reciprocating cross head associated with the welding means for pulling the longitudinal wires through the welding means to effect spacing of the cross wires, a plurality of wire gripping fingers pivotally mounted on the cross head arranged to engage a cross wire adjacent the welds, a lever arm associated with the gripping fingers, a wrist pin on the lever arm having lost motion connection with the cross head, an actuator for the cross head, a connecting rod operably connecting the actuator with the wrist pin whereby the cross head is reciprocated and the gripping fingers moved to and from engagement with the matting during change of travel of the cross head, and means for adjusting movement of the cross head to vary spacing of the cross wires.

9. An apparatus for producing a matting of the character described including means for straightening spaced wires to form the matting, means for successively positioning a cross wire on the spaced wires, means for welding the crossing points of said wires to secure the cross wires to the spaced wires, means for gripping a cross wire adjacent the welds, means for reciprocating the gripping means to advance the spaced wires through the straightening means and bring the spaced wires into position for applying a succeeding cross wire, and means for actuating the welding means operable in timed relation with said reciprocating means.

10. An apparatus for producing a matting of the character described including means for tensioning spaced wires, means for feeding a cross wire over the spaced wires, means for positioning the cross wire on the spaced wires, means for welding the cross wire to the spaced wires, reciprocating means for gripping a cross wire adjacent the welds to advance the spaced wires for applying a succeeding cross wire and operable upon movement of the reciprocating means to actuate the positioning means.

11. In a machine of the character described for producing matting having longitudinal and cross wires, means for successively welding the cross wires to the longitudinal wires, means for positioning the cross wires over the longitudinal wires during welding, reciprocating means for intermittently advancing the matting through the welding means, wire gripping means carried by the reciprocating means for gripping a welded cross wire, means for actuating the reciprocating means including means for moving the wire gripping means to and from the engagement with the wires, and means operable upon movement of the reciprocating means for actuating the positioning means.

12. In a machine of the character described for producing matting having longitudinal and cross wires, means for successively welding the cross wires to the longitudinal wires, means for clamping the cross wires over the longitudinal wires, reciprocating means for advancing the matting through the welding means, wire gripping fingers pivotally mounted on the reciprocating means for engaging a cross wire adjacent the welds, and an adjustable plate member on the reciprocating means for engaging a second cross wire to supplement the fingers.

13. In a machine of the character described for producing matting having longitudinal and cross wires, means for successively welding the cross wires to the longitudinal wires, means for clamping the cross wires over the longitudinal wires, reciprocating means for advancing the matting through the welding means, wire gripping fingers pivotally mounted on the reciprocating means for engaging a cross wire adjacent the welds, and an adjustable plate member on the reciprocating means for engaging a second cross wire to supplement the fingers.

14. In an apparatus of the character described, a supporting frame, a cross-head mounted for reciprocatory movement on the frame, wire gripping fingers pivotally mounted on the cross-head, a lever arm associated with the gripping fingers, a wrist pin on the lever arm having lost motion connection with the cross-head, an actuator on the frame for moving the cross-head, and a rod connecting the actuator with the wrist pin to reciprocate the cross-head and to effect pivotal movement of the gripping fingers during change of travel of the cross-head.

15. In an apparatus of the character described, a supporting frame, a cross-head mounted for reciprocatory movement on the frame, wire gripping fingers pivotally mounted on the cross-head, a lever arm associated with the gripping fingers, a wrist pin on the lever arm having lost motion connection with the cross-head, an actuator on the frame for moving the cross-head, a rod connecting the actuator with the wrist pin to reciprocate the cross-head and to effect pivotal movement of the gripping fingers during change of travel of the cross-head, and a fixed gripping means on the cross-head for supplementing the gripping fingers.

16. In an apparatus of the character described, a supporting frame, a cross-head mounted for reciprocatory movement on the frame, wire gripping fingers pivotally mounted on the cross-head, a lever arm associated with the gripping fingers, a wrist pin on the lever arm having lost motion connection with the cross-head, an actuator on the frame for moving the cross-head, a rod connecting the actuator with the wrist pin to reciprocate the cross-head and to effect pivotal movement of the gripping fingers during change of travel of the cross-head, a second gripping means pivoted in fixed position on the frame, and means connected to operate in synchronism with the actuator for pivoting said second gripping means.

17. In an apparatus of the character described, a supporting frame, a cross-head mounted for reciprocatory movement on the frame, wire gripping fingers pivotally mounted on the cross-head, a lever arm associated with the gripping fingers, a wrist pin on the lever arm having lost motion connection with the cross-head, an actuator on the frame for moving the cross-head, a rod connecting the actuator with the wrist pin to reciprocate the cross-head and to effect pivotal movement of the gripping fingers during change of travel of the cross-head, a second gripping means pivoted in fixed position on the frame, means connected to operate in synchronism with the actuator for pivoting said second gripping means, and a fixed gripping means on the cross head for supplementing the gripping fingers.

18. In a machine of the character described, a frame, gripping means, means mounting the gripping means for reciprocatory movement on the frame, a crank on the frame for reciprocating the gripping means, and a lost motion connection between the crank and the gripping means to effect engagement and disengagement of the gripping means during change of travel of the gripping means.

HERBERT W. GRONEMEYER.
FRED C. HERBSTER.